United States Patent [19]
Chmura et al.

[11] 3,782,794
[45] Jan. 1, 1974

[54] ANTIFRICTION BEARING

[75] Inventors: William J. Chmura, Southington; Kenneth A. Catlin, Berlin, both of Conn.

[73] Assignee: Textron Inc., Providence, R.I.

[22] Filed: Dec. 8, 1972

[21] Appl. No.: 313,561

[52] U.S. Cl............................. 308/193, 308/241
[51] Int. Cl....................... F16c 33/64, F16c 33/66
[58] Field of Search................ 308/0.005, 241, 191, 308/193, 192, 195, 190; 29/148,4 A

[56] References Cited
UNITED STATES PATENTS
3,365,253  1/1968  Holler.................................. 308/190

Primary Examiner—Charles J. Myhre
Assistant Examiner—Frank Susko
Attorney—Nichol M. Sandoe et al.

[57] ABSTRACT

Low-cost antifriction bearing rings are disclosed made by the powder metal compaction and sintering of ring blanks followed by densification of the raceway by mechanical working, such as by roll-forming, the bearing rings so produced being characterized by increased rolling contact fatigue life, increased static load capacity and decreased bearing noise as compared to powder metal rings made by compaction and sintering but in which the raceways are produced by machining. By preferably maintaining a region of porosity outside the densified area adjacent the raceway, the rings can be made to exhibit compliancy and thus further increase the fatigue life thereof.

19 Claims, 6 Drawing Figures

PATENTED JAN 1 1974  3,782,794

ANTIFRICTION BEARING

This invention relates to annular bearing rings produced by powder metallurgy and to antifriction bearing assemblies produced therefrom, and also to a powder metallurgy method for producing low-cost annular bearing rings.

STATE OF THE ART

Attempts have been made to manufacture antifriction bearings by powder metallurgy techniques (P/M) in order to utilize the high production rates and efficiencies provided by such methods. However, bearings produced by such methods have not been too successful in high performance bearing applications. The P/M methods employed included powder compaction to produce a ring blank, pre-sintering of the blank followed by a coining operation (repressing) and then a final sintering step to produce rings with densities averaging about 90 to 94 percent of the theoretical density of the material, the high densities being needed to assure desired physical properties.

Following the manufacture of cylindrical ring blanks as described hereinabove, additional costs are incurred involving the machining of raceways or shield grooves in the bearing rings. The rings are then heat treated and subjected to final finishing operations. However, bearings produced in this manner are generally characterized by low fatigue life and relatively high noise level.

It has been considered by those skilled in the art that porosity in P/M bearing rings is advantageous in attenuating the noise level in bearings containing such rings. However, this is not the case in the situation where the generation of noise due to surface porosity far exceeds the material's inherent attenuation capabilities. Such properties are unacceptable for all but the most crude requirements of ball bearings.

It is known to improve bearing fatigue life by making conventional bearing rings more compliant to applied load. However, the manufacture of compliant bearings by conventional methods is costly due to the additional machining operations required to remove material from the bore of the ring under the raceway in order to enable the ring to give under applied load like the flexure of a beam. In this connection, high ball loads tend to cause the raceway to distort because of the beam flexing effect of the compliant ring, whereby the ball load is distributed over larger areas with a concommitant reduction in stresses.

It is well known that porous materials which have lower moduli of elasticity than wrought materials tend to deflect more under load than wrought material. This property lends itself ideally to the production of compliant bearing rings. However, as stated hereinabove, such ring materials do not provide sufficient noise and vibration attenuation due to surface porosity in the raceway, since the raceways are produced by machining or grinding.

Thus, it would be desirable to provide a relatively low-cost bearing made by powder metallurgy which in use exhibits less noise and vibration and which also exhibits improved resistance to fatigue.

OBJECTS OF THE INVENTION

An object of the present invention is to manufacture a high performance antifriction bearing utilizing low-cost high production powder metallurgy methods of compaction and sintering.

Another object of the present invention is to provide a powder metallurgy method of producing annular bearing rings in which the raceway is formed in the rings by mechanically working or deforming the bearing surface, such as by roll forming, whereby the bearing ring is characterized by improved fatigue life as compared to P/M rings in which the raceway is machined or ground.

A further object is to provide as an aritcle of manufacture a P/M bearing ring in which the raceway is characterized by a high density zone at or near the surface thereof as compared to the more porous structure of the ring away from the dense zone, the bearing ring by virtue of its porosity being also compliant and adding further to the fatigue life of the bearing ring.

These and other objects will more clearly appear when taken in conjunction with the following disclosure and the accompanying drawings, wherein.

STATEMENT OF THE INVENTION

Figure 1:
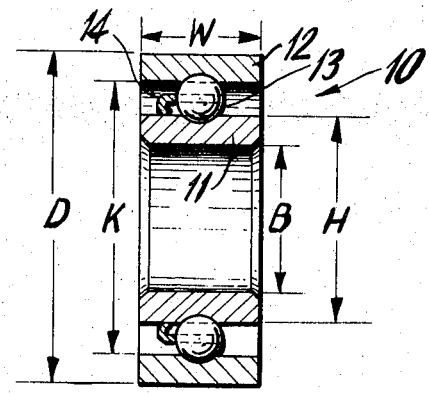
FIG. 1 depicts a typical bearing comprising inner and outer bearings with bearing balls disposed therebetween.

Stating it broadly, the invention provides as one embodiment an annular metal bearing ring formed of a sintered powder metal blank, a circumferential bearing face of said ring being characterized by a mechanically worked bearing raceway of suitable depth conformed to support rolling elements therein, such that an area within the ring immediately adjacent to the bottom of the mechanically worked raceway is characterized in cross section by a highly dense zone of average density of at least about 95 percent of the theoretical density of the metal. Preferably, though not necessarily, the remaining portion of the sintered metal outside the dense zone may be relatively porous compared to the dense region and thus may have an average density ranging from about 80 to 92 percent of said theoretical density of the metal and, more preferably, about 85 to 92 percent. The dense zone at and adjacent the raceway confers improved fatigue life to the bearing ring. The fatigue life may be further increased by allowing for a porous region below the dense zone which makes the bearing ring more compliant to applied load.

Normally, bearing rings are produced by machining the desired shape from wrought metal bar stock or tubing on automatic screw machines. Production rates obtained with this method are usually limited by the intrusion of cutoff and/or drilling operations. The production rates generally range from about 300 to 600 pieces per hour. In producing rings by such machining operations, material loss may range anywhere from 20 to 60 percent by weight depending upon the final size of the machined ring. The machined ring is later heat treated, ground and assembled with other components to form the bearing.

The invention, on the other hand, provides economic advantages in the production of high performance bearings in that the powder metallurgy method employed enables the utilization of almost 100 percent of the starting material, while providing production rates substantially exceeding those attained by conventional screw machine operations. Thus, the steel powder composition is compacted into a ring blank of desnity ranging from about 80 to 92 percent of the theoretical density of the metal, the blank then sintered under substantially non-oxidizing and noncarburizing conditions at an elevated temperature (e.g. 2,050° F) and the raceway mechanically worked into the ring, such as by roll forming, whereby to produce a highly dense zone at and below the raceway whose average density is at least about 95 percent and, preferably, at least about 98 percent of the theoretical density of the metal. Following the production of the raceway, the ring is subjected to heat treatment by heating it to an austenitizing temperature preparatory to quench hardening. A carburizing procedure may be introduced if required prior to this heat treatment. This heating further augments and strengthens the sintering bonds. Following heat treatment, the ring is finish fround, if desired.

As will be obvious to those skilled in the art, the ring with the mechanically worked raceway may be resintered if desired prior to heat treatment, such as by hearing it at a temperature of about 2,050° F for a suitable time period, e.g. 20 minutes or more.

Since P/M materials generally exhibit low tensile ductility, it is important that precautions be taken during the mechanical working operation to insure that the work is applied to the ring blank in the form of compressive stresses.

A preferred method embodiment of the invention resides in providing a sintered porous annular bearing ring metal blank or density ranging from about 80 to 92 percent of the theoretical density of the metal, supporting the annular blank on a rotating mandrel or arbor, and then mechanically working or deforming a circumferential face of the blank by roll-forming a raceway onto said circumferential face of the ring by pressing a rotating contoured roll-forming die against said face until the desired raceway depth has been achieved. The raceway produced in this manner is highly dense and may be characterized in cross-section by a crescent-shaped region, in the case of a ball bearing, adjacent the bottom of the raceway having an average density as stated hereinbefore of at least about 95 percent of the theoretical density of the metal, the remaining portion of the ring below the dense zone preferably having an average density of about 80 to 92 percent.

By having a dense structure at and adjacent the raceway, good support for the bearing balls is assured backed up by a more porous section which provides compliance under load. In addition, the bearing is substantially noiseless and also exhibits much less vibration. Moreover, the bearing ring has good fatigue life.

DETAILS OF THE INVENTION

POWDER METAL COMPACTION

In the production of the sintered annular blank, a steel powder composition is cold pressed in an annular die dimensioned to produce the desired size. The composition is compacted at a pressure of about 30 to 45 tons per square inch and the resulting blank then sintered under substantially non-carburizing conditions in an atmosphere of cracked ammonia for about 20 minutes at a temperature of about 2,050° F. The sintered blank has a density of about 80 to 92 percent of the actual steel density and generally from about 85 to 92 percent of the actual density.

POWDER TYPE AND ALLOY

The types of steel powder used are preferably selected according to those which are economically attractive as well as those which are the most practical. The powder composition may comprise a mixture of elemental powders. Generally, such mixtures tend to result in composition heterogeniety. However, this may be beneficial since such compositions tend to be incompletely alloyed during sintering and thereby provide ductile areas which inhibit brittle fractures from forming in the porous regions of the bearing ring.

Pre-alloyed powders, however, are preferred such as those produced by atomization from a liquid melt. To assure that such powders are compactable, the carbon is omitted from the composition, the carbon being subsequently blended to the atomized powder prior to compaction. Alternatively, the carbon can be added after the blank has been sintered by carburizing the sintered blank to the desired carbon level.

The invention is applicable to a wide variety of bearing steels, such as 52100-type steels, low nickel-molybdenum steels, molybdenum-manganese steels, and the like. Thus, for the purpose of this invention, a steel is defined as a composition containing by weight at least about 65 percent iron, about 0.3 to 1.5 percent carbon and the balance steel alloying ingredients.

Examples of bearing steels which were tested in accordance with the invention are 4 percent Ni, 2 percent Cu, 0.6 percent C and the balance iron; 1.5 percent Mo, 1 percent C and the balance iron; 0.5 percent Mo, 0.5 percent Mn, 1 percent C and the balance iron; and the bearing steel designated as 52100 comprising 1.5 percent Cr, 0.5 percent Mo, 1.0 percent C and the balance iron. Test results indicated the atomized powders to be particularly preferred.

ILLUSTRATIVE TYPICAL BEARING

As depicted in FIG. 1, a typical bearing 10 is shown comprising inner and outer rings 11 and 12, respectively, with balls 13 confined therebetween and held in the raceways by cage 14.

PRODUCTION OF THE RACEWAY

Following the production of the sintered annular blank by powder metallurgy in accordance with the invention, a circumferential face of the blank is subjected to mechanical cold working to produce the raceway therein. Preferably, this is done by roll-forming using an apparatus of this type, for example, shown in FIGS. 5 and 6. However, it is understood that any apparatus can be employed that will produce a raceway on a sintered annular blank.

Figure 5:
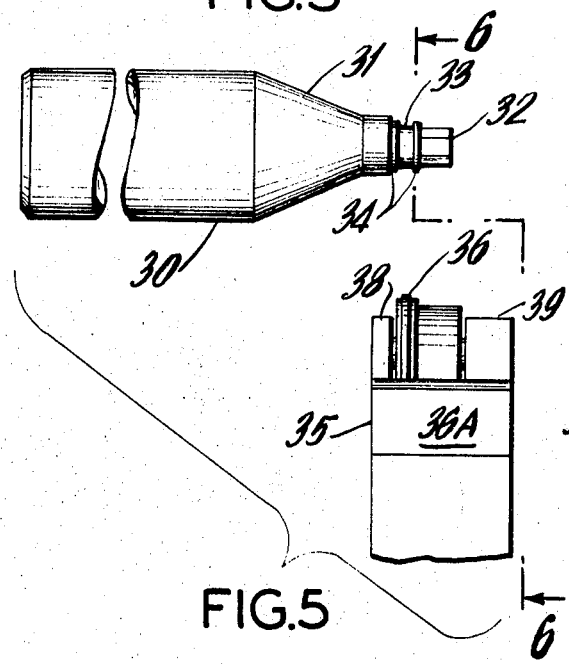
FIG. 5 is a line drawing in plan view showing one embodiment of producing a raceway on the outer surface of an inner bearing ring blank by roll-forming.
Figure 6:
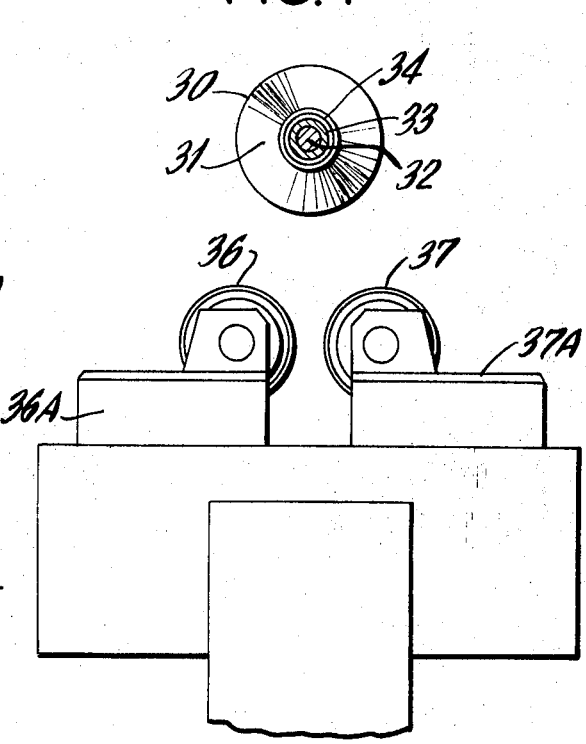
FIG. 6 is a side elevation of the embodiment of FIG. 5.

Referring to the schematic of FIG. 5, a line drawing of an embodiment is shown comprising a support shaft 30 tapered at 31 and which is drilled for the insertion of a cylindrical mandrel 32 of diameter corresponding to the inner diameter of a powder metal inner bearing ring.

The annular powder metal blank 33 is slipped onto the mandrel between two spacers 34 and support shaft 30. A toolholder 35 is provided with a pair of idle former rolls 36 and 37 (note FIG. 6) rotatably mounted on supports 36A, 37A, between pillow blocks 38 and 39.

The form roll assembly is cross fed into the metal blank at a rate predetermined to form the raceway to the desired depth. The roll penetration typically is about 0.0002 inch per revolution. The raceway produced generally has a better surface finish than those produced by machining. This has an important bearing on increasing fatigue life.

While the foregoing is described with respect to the prodcution of an inner bearing ring, substantially the same procedure is employed in producing a raceway in an outer ring, except for the modification in the apparatus.

BEARING PROPERTIES

Figure 2:
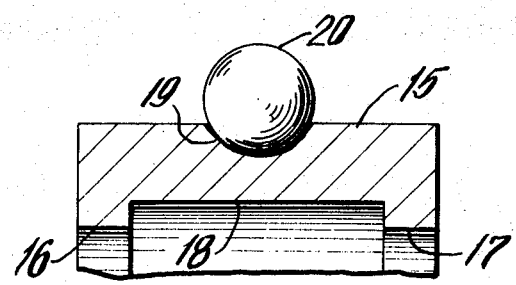
FIG. 2 is an enlarged section of an annular bearing ring showing a raceway with a ball therein, the ring being designed for use as a compliant bearing of the beam section type known in the art.

As stated hereinbefore, compliant bearings in which the inner annular ring is designed as a beam section (note FIG. 2) are known in the prior art, the particular design being produced by machining from a solid ring. The inner ring 15 (only a section or annulus is shown) is supported on a shaft at its inner diameter defined by extending supports 16 and 17 to provide a beam support with a span 18 as shown to allow for some elastic bending (compliance) during use under load, the ring having a raceway 19 around which balls, e.g. balls 20, are supported as depicted in FIG. 1.

According to the invention, the compliant bearing is made by powder metallurgy by producing the sintered blank with a porous structure and then roll-forming the raceway so as to provide a density gradient from the bottom of the raceway to the ring bore, the high density zone being at and adjacent the bottom of the raceway.

Figure 3:
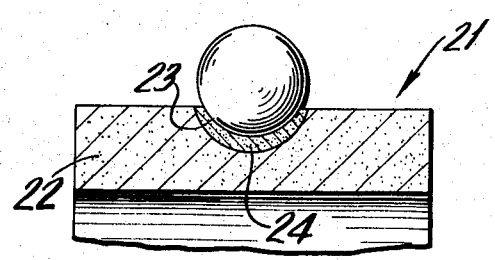
FIG. 3 is another enlarged section of a bearing ring produced in accordance with the invention by powder metallurgy, the ring being dense adjacent the raceway and relatively porous in the remaining underlying portion of the ring.
Figure 4:
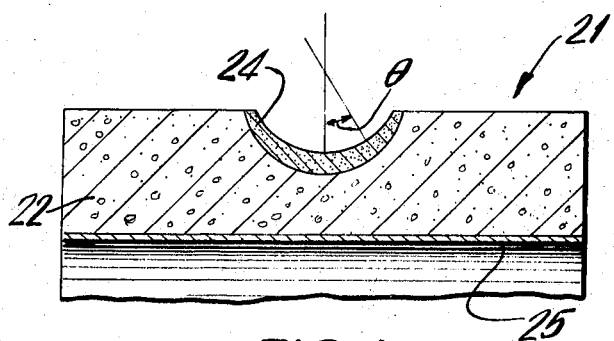
FIG. 4 depicts the bearing ring of FIG. 3 further enlarged to show the dense area ajacent the raceway in the form of a highly dense crescent-shaped zone, the remaining portion of the ring being porous by comparison.

This is shown by way of example in FIG. 3, the annulus 21 of the ring being relatively porous in the main body thereof at 22 below the raceway, the raceway 23 having been roll-formed to provide a highly dense crescent-shaped region or zone 24. The final average density of the dense zone is at least about 95 percent, e.g. 98 percent or higher, of the true density of the material, the thickness of the dense zone being a maximum at the ball rolling locus below the bottom of the raceway, the thickness of the dense zone reducing to each side of the ball axis according to the casing of angle $\theta$ as shown in FIG. 4. It may be desirable to produce a shallow dense region 25 at the base surface of the annular ring adjacent the support mandrel.

The boundary between the dense zone (or zone of densification and the more porous region is not necessarily sharp, since one region can blend into the other.

The thickness of the highly dense zone below the bottom of the raceway should be at least about 25 percent of the maximum depth of the raceway and, preferably, at least about 50 percent of the raceway depth.

The advantage of the roll-formed raceway is that it provides a dense region having a desired Young's modulus coupled with optimum resistance to fatigue where it is needed the most. Another advantage of roll-forming is that a raceway of very high smoothness is obtained. As stated hereinbefore, this is important in assuring optimum fatigue life of the P/M bearing ring.

By mechanically working the raceway into the bearing ring, a reduction and a modulus gradient are provided in which the gradient is a maximum at the raceway and then decreases to a lower value at the more porous or less dense portion of the ring below the crescent-shaped dense region, the more porous section of the ring providing the desired compliance.

The relationship between Young's modulus, the density and the fatigue properties of a sintered steel composition of 4 percent nickel, 0.8 percent carbon and the balance essentially iron is illustrated as follows:

| Density | % Theoretical Density | Young's Modulus | Fatigue Limit ($10^7$ Cycles) |
|---|---|---|---|
| 6.6 g/cc | 84 | $17 \times 10^6$ psi | 23,000 psi |
| 7.0 | 89 | $21 \times 10^6$ psi | 31,000 psi |
| 7.4 | 94 | $23 \times 10^6$ psi | 37,000 psi |
| 7.87 | 100 | $29 \times 10^6$ psi | — |

As will be noted, it would be desirable that the density at the raceway be over 95 percent to assure optimum physical properites where the load of the bearing is the greatest, the denstiy beyond the raceway area in the ring ranging anywhere from about 80 to 92 percent of the theoretical density of the metal. Thus, the desired fatigue properties at the loaded portion of the bearing are assured while the remainder of the ring provides the necessary "give" to the applied load. By rolling in the raceway on a sintered powder metallurgy blank, the economy of a coined ring is assured while providing much higher densities than the coined ring in the raceway region.

Comparison tests were conducted to determine the vibration static load capacity, deflection under load and the endurance life for a steel composition containing 0.5 percent Mo, 0.5 percent Mn, 1 percent C and the balance essentially Fe. The comparison was made between a P/M ring in which the raceway was machined and the P/M ring of the invention in which the raceway was roll-formed. Both rings had a density of about 86 percent of theoretical density following compaction and sintering. The raceway in one ring was machined, while the raceway in the other ring was roll-formed such that the final average density of the roll-formed ring was about 92 percent of theoretical. The results obtained are as follows:

| | Machined P/M Ring (1) | Roll-formed P/M Ring (2) |
|---|---|---|
| % of Theoretical Density | 86 | 92 |
| Vibration Level | 6.0 | 2.0 |
| Load to Cause 0.0001 Inch Permanent Set | 52 lbs. | 125 lbs. |
| $L_{10}$ Life at 3600 RPM Speed | 6.0 hours | 85.0 hours |

As will be noted, P/M Ring (2) of the invention is markedly superior to the P/M Ring (1) of the prior art in vibration level, in the amount of load it can support before a permanent set of 0.0001 inch results and in the fatigue life.

The vibration level is determined by a testing device which reveals the vibration characteristics of the bearings on test indicating the overall bearing quality resulting from accuracy of manufacture and surface finish of races and balls.

In the case of the load to cause a permanent set of 0.0001 inch, it will be noted that the P/M Ring (2) of the invention is capable of supporting more than double the load compared to P/M Ring (1).

The $L_{10}$ life of the bearings stated in the table is obtained as a statistical number. Because of the variation in the lives of individual bearings, the life of a bearing is defined as the number of hours at a given speed that 90 percent of a group of bearings will attain or exceed before the onset of fatigue. This basic definition is commonly referred to as the $L_{10}$ life.

As will be noted from the table, the P/M Ring(2) of the invention exhibited a much higher fatigue life of 85 hours as compared to the much lower fatigue life of 6.0 hours for P/M Ring (1), an improvement of over 14 times.

As will be apparent from the foregoing test results, the production of P/M bearing rings in accordance with the invention enables the economic production of antifriction bearing assemblies having improved properties. Thus, the invention also provides an antifriction bearing assembly comprising inner and outer rings defining an annular bearing chamber having raceways with rolling elements disposed therebetween, at least one of said rings being formed of sintered powdered metal, e.g. bearing steel, such that a circumferential bearing face of said sintered ring is characterized by a mechanically worked or roll-formed bearing raceway conformed to support said rolling elements therein, an area in said sintered ring immediately adjacent to the bottom of the raceway being characterized in cross section by a highly dense zone of average density of at least about 95 percent of the theoretical density of the metal, the remaining portion of the sintered metal of said ring outside the dense zone being substantially porous and having an average density ranging from about 80 to 92 percent of the theoretical density of the metal.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An annular metal bearing ring formed of a sintered powder metal blank,
   a circumferential bearing face of said ring being characterized by a mechanically worked bearing raceway of suitable depth conformed to support rolling elements therein,
   an area within said ring immediately adjacent to the bottom of the raceway being characterized in cross section by a highly dense zone of average density of at least about 95 percent of the theoretical density of the metal.

2. The annular metal bearing ring of claim 1, wherein the thickness of the highly dense zone below the bottom of the raceway is at least about 25 percent of the maximum depth of said raceway and wherein the remaining portion of the sintered metal ring outside the dense zone is substantially porous and has an average density of about 80 to 92 percent of the theoretical density of the metal.

3. The annular bearing ring of claim 2, wherein the mechanically worked raceway is conformed to support bearing balls therein and wherein the depth of the highly dense zone is at least about 50 percent of the maximum depth of said raceway.

4. The annular bearing ring of claim 3, wherein the highly dense zone has an average density of at least about 98 percent of the theoretical density of the metal, wherein the highly dense zone is substantially crescent-shaped, and wherein the remaining portion of the sintered metal ring outside the dense zone has an average density of about 85 to 92 percent of the theoretical density of the metal.

5. A compliant annular metal bearing ring formed of a sintered powder metal blank of a heat treatable steel composition,
   a circumferential bearing face of said ring being characterized by a roll-formed bearing raceway of suitable depth conformed to support rolling elements therein,
   an area within said ring immediately adjacent to the bottom of the raceway being characterized in cross section by a highly dense zone of average density of at least about 95 percent of the theoretical density of the metal,
   the remaining portion of the sintered metal outside of the dense zone being substantially porous and having an average density ranging from about 80 to 92 percent of the theoretical density of the metal.

6. The annular metal bearing ring of claim 5, wherein the thickness of the highly dense zone below the bottom of the raceway is at least about 25 percent of the maximum depth of said raceway.

7. The annular bearing ring of claim 6, wherein the roll-formed raceway is conformed to support bearing balls therein, wherein the thickness of the highly dense zone is at least about 50 percent of the maximum depth of said raceway.

8. The annular bearing ring of claim 7, wherein the dense zone is substantially crescent-shaped and has a density of at least about 98 percent of theoretical density of the steel, and wherein the region outside of the dense zone has a density of about 85 to 92 percent of the theoretical density of the steel.

9. An antifriction bearing assembly comprising inner and outer rings defining an annular bearing chamber having raceways with rolling elements disposed therebetween, at least one of said rings being formed of sintered powdered metal, such that:
   a circumferential bearing face of said at least one sintered ring is characterized by a mechanically worked bearing raceway of suitable depth conformed to support said rolling elements therein,
   an area within said at least one ring immediately adjacent to the bottom of the raceway being characterized in cross section by a highly dense zone of average density of at least about 95 percent of the theoretical density of the metal,
   the remaining portion of the sintered metal outside said dense zone being substantially porous and having an average density ranging from about 80 to 92 percent of the theoretical density of the metal.

10. The antifriction bearing assembly of claim 9, wherein the thickness of the highly dense zone below the bottom of the raceway is at least about 25 percent of the maximum depth of said raceway.

11. The antifriction bearing assembly of claim 10, wherein the mechanically worked raceway is conformed to support bearing balls therein and wherein the depth of the highly dense zone is at least about 50 percent of the maximum depth of said raceway.

12. The antifriction bearing assembly of claim 11, wherein the highly dense zone of said sintered ring has an average density of at least about 98 percent of theoretical density of the metal, wherein the highly dense zone is substantially crescent-shaped and, wherein the remaining portion of the sintered ring outside of the dense zone has an average density of at least about 85 to 92 percent of the theoretical density of the metal.

13. An antifriction bearing assembly comprising compliant inner and outer rings of steel defining an annular bearing chamber having raceways with bearing balls disposed therebetween, each of said rings being formed of sintered powdered metal, such that:

a circumferential bearing face of each ring is characterized by a roll-formed bearing raceway of suitable depth conformed to support said bearing balls therein, an area within each ring immediately adjacent to the bottom of the raceway being characterized in cross section by a highly dense substantially crescent-shaped zone of average density of at least about 95 percent of the theoretical density of the metal, the remaining portion of the sintered metal outside the crescent-shaped zone being substantially porous and having an average density ranging from about 80 to 92 percent of the theoretical density of the metal.

14. The antifriction bearing assembly of claim 13, wherein the thickness of the highly dense zone below the bottom of the raceway of each ring is at least about 25 percent of the maximum depth of said raceway.

15. The antifriction bearing assembly of claim 14, wherein the thickness of the highly dense zone of each ring is at least about 50 percent of the maximum depth of said raceway.

16. The antifriction bearing assembly of claim 15, wherein the highly dense zone in each ring has an average density of at least about 98 percent of the theoretical density of the steel, and wherein the region outside of the dense zone in each ring has an average density of about 85 to 92 percent of the theoretical density of the steel.

17. A method for producing an annular metal bearing ring by powder metallurgy which comprises, forming a sintered porous powder metal annular blank corresponding substantially to said bearing ring, and then forming a bearing raceway on a circumferential bearing face of said annular blank by mechanical working a selected area of said face to a suitable depth to support rolling elements therein, and thereby produce a highly dense zone adjacent the bottom of the raceway of average density of at least about 95 percent of theoretical density of the metal, the remaining portion of the sintered metal outside the dense zone being substantially porous and having an average density of about 80 to 92 percent of the theoretical density of the metal.

18. The method of claim 17, wherein the sintered ring is steel, wherein the raceway is roll-formed to receive balls therein and wherein the highly dense zone below the raceway has a thickness of at least 25 percent of the maximum raceway depth.

19. The method of claim 17, wherein the raceway is roll-formed to provide a highly dense zone below the raceway of average density of at least about 98 percent of the theoretical density of the metal, the dense zone having a thickness of at least about 50 percent of the maximum raceway depth, and wherein the remaining portion of the sintered metal outside the dense zone has an average density of about 85 to 92 percent of the theoretical density of the metal.

* * * * *